US011763018B2

(12) United States Patent
Ben-Natan et al.

(10) Patent No.: US 11,763,018 B2
(45) Date of Patent: Sep. 19, 2023

(54) SYSTEM AND METHOD FOR POLICY CONTROL IN DATABASES

(71) Applicant: Imperva, Inc., San Mateo, CA (US)

(72) Inventors: Ron Ben-Natan, Lexington, MA (US); Gabriel Beyo, Tel Aviv (IL); Rosa Miroshnikov, Toronto (CA); Ury Segal, Vancouver (CA)

(73) Assignee: IMPERVA, INC., San Mateo, CA (US)

( * ) Notice: Subject to any disclaimer, the term of this patent is extended or adjusted under 35 U.S.C. 154(b) by 294 days.

(21) Appl. No.: 17/181,565

(22) Filed: Feb. 22, 2021

(65) Prior Publication Data

US 2022/0269806 A1 Aug. 25, 2022

(51) Int. Cl.
*G06F 21/62* (2013.01)
*G06F 16/28* (2019.01)

(52) U.S. Cl.
CPC ........ *G06F 21/6218* (2013.01); *G06F 16/285* (2019.01)

(58) Field of Classification Search
CPC .......................... G06F 16/285; G06F 21/6218
See application file for complete search history.

(56) References Cited

U.S. PATENT DOCUMENTS

| | | | | |
|---|---|---|---|---|
| 7,243,097 B1* | 7/2007 | Agrawal | ............. | G06F 16/2452 |
| 7,680,822 B1* | 3/2010 | Vyas | .................... | G06F 21/604 |
| | | | | 709/225 |
| 8,544,058 B2* | 9/2013 | Lim | .................... | G06Q 10/06 |
| | | | | 713/169 |
| 8,966,576 B2* | 2/2015 | Giambiagi | .............. | H04L 63/10 |
| | | | | 707/769 |
| 9,369,431 B1* | 6/2016 | Kirby | ...................... | H04L 63/20 |
| 9,942,409 B1* | 4/2018 | Blomgren | ................ | G06F 8/34 |
| 10,387,669 B1* | 8/2019 | Lim | ....................... | G06F 21/604 |
| 10,592,683 B1* | 3/2020 | Lim | ....................... | H04L 63/20 |
| 10,606,957 B1* | 3/2020 | Good | ...................... | G06F 40/55 |
| 10,742,421 B1* | 8/2020 | Wentz | ................... | H04L 9/0897 |
| 2008/0066150 A1* | 3/2008 | Lim | ....................... | G06Q 10/06 |
| | | | | 726/1 |
| 2008/0275829 A1* | 11/2008 | Stull | ......................... | H04L 9/00 |
| | | | | 726/26 |
| 2011/0321122 A1* | 12/2011 | Mwangi | ................. | G16H 10/60 |
| | | | | 726/1 |
| 2015/0295939 A1* | 10/2015 | Rissanen | ................. | H04L 63/10 |
| | | | | 726/1 |
| 2016/0239677 A1* | 8/2016 | Roth | ....................... | H04L 63/20 |

(Continued)

*Primary Examiner* — Gary S Gracia
(74) *Attorney, Agent, or Firm* — WOMBLE BOND DICKINSON (US) LLP

(57) ABSTRACT

Embodiments of the present disclosure relate to generating a high level security policy for a data repository without knowledge of the access control, entitlement, and other models of the data repository. A set of abstractions that define a security policy language may be generated based on data in a data repository collection. The set of abstractions may define a security policy language, which may be provided to a security administrator who can define a security policy with the security policy language. The security policy may be translated into a common physical language to generate a common physical policy. The processing device may then translate the common physical policy into a set of commands for each of one or more data repositories that the data repository collection is comprised of.

20 Claims, 7 Drawing Sheets

(56) References Cited

U.S. PATENT DOCUMENTS

| | | | |
|---|---|---|---|
| 2017/0093753 A1* | 3/2017 | Summers | H04L 67/01 |
| 2017/0244704 A1* | 8/2017 | Brickell | H04L 63/123 |
| 2019/0132136 A1* | 5/2019 | Scarlata | H04L 9/3268 |
| 2020/0320255 A1* | 10/2020 | Xing | G06F 40/263 |
| 2020/0380120 A1* | 12/2020 | Tokuchi | G06F 21/10 |
| 2020/0404002 A1* | 12/2020 | Patel | G06F 40/30 |
| 2021/0365592 A1* | 11/2021 | Rabbani | H04L 9/0877 |
| 2022/0100747 A1* | 3/2022 | Mire | G06F 16/211 |
| 2022/0150260 A1* | 5/2022 | Zhang | H04L 9/3263 |
| 2022/0188418 A1* | 6/2022 | Aschauer | G06F 21/57 |
| 2022/0269806 A1* | 8/2022 | Ben-Natan | G06F 16/285 |

* cited by examiner

SYSTEM AND METHOD FOR POLICY CONTROL IN DATABASES

TECHNICAL FIELD

Aspects of the present disclosure relate to enterprise database systems, and more particularly, to managing the security policy for enterprise database systems.

BACKGROUND

Database systems may include a data repository and a database server that implements an access control system which regulates access to the data stored in the data repository. A data repository may refer to any appropriate storage system such as an object storage system (e.g., Amazon S3™ system), a database, a filesystem, and a cloud storage layer, for example. Access may be granted only to those people (database system users) who are allowed to access such data and access may be restricted to unauthorized persons. One of the primary functions performed by the access control system is authorization. Authorization determines whether a user should be allowed to access the data or make the transaction they are attempting to make. There are numerous types of access control models including discretionary access control (DAC), mandatory access control (MAC), and role based access control (RBAC), which is the most commonly used, for example. RBAC grants access based on a user's role and implements key security principles such as "least privilege" and "separation of privilege." Thus, a database system user attempting to access information can only access data necessary for their role. An access control system may implement one or more of the above access control methods to restrict access to the data of a data repository based on a variety of factors such as database username, client application, application username, IP address or hostname, operating system user, number of unsuccessful login attempts, and query text, for example.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
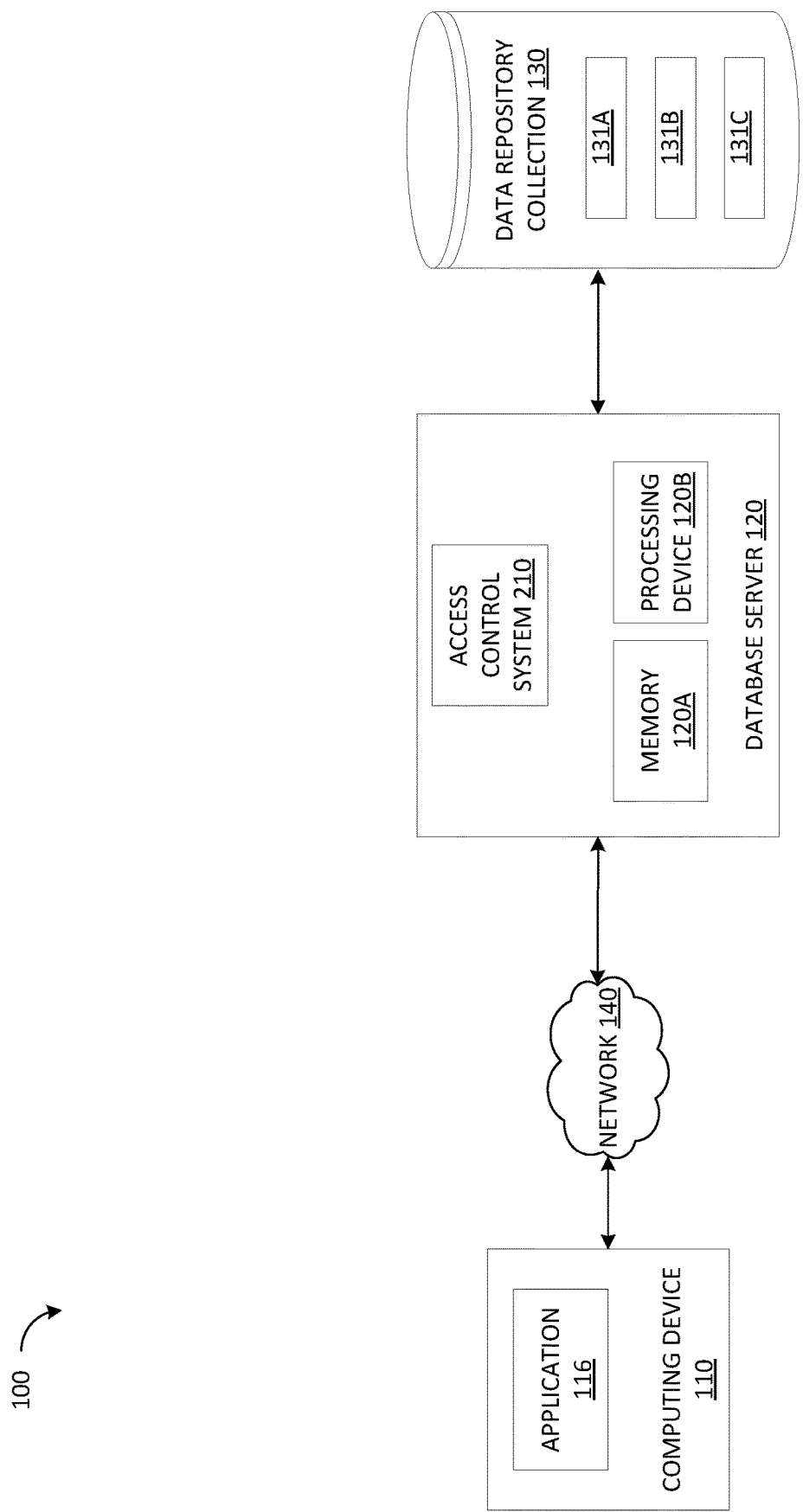
FIG. 1 is a block diagram that illustrates an example system, in accordance with some embodiments of the present disclosure.

Access control systems may operate based on a security policy defined by e.g., an administrator or other type of privileged user of the data repository. The security policy for a data repository is defined and implemented in a manner specific to that data repository. For example, the language used to define the policy, the method for creating the policy, and the manner in which information about which users have what privileges is obtained are all different from data repository to data repository. A language used to define a security policy for a data repository is generally best understood by the administrator of that data repository, and is difficult for other personnel to understand. For example, an Oracle™ database administrator may define roles and privileges in a particular manner, which is different from the manner in which an administrator of another data repository may define roles and privileges. This problem is magnified in database systems that include a "data repository collection," (e.g., a data lake) comprising a number of different data repositories. In such scenarios, the database server may include an access control system having an access control layer for each data repository the data repository collection is comprised of, each access control layer having a unique security policy. Thus, the level of complexity in defining a security policy for such a data repository collection is high.

Third party security providers can provide security for these data repositories, such as multi-factor authentication, for example. However, it is difficult for third party providers to set the security policy because that function is generally the purview of the data repository administrator owing to the language specific nature of the security policy. In addition, many third party security personnel don't have the requisite skill set to understand the different languages/implementation mechanisms of a variety of different data repositories. As a result, instead of managing access, many third party security providers that cater to the information security professional have adopted a "trust but verify" approach where a data repository administrator may operate while a third party system "records" any actions they take. However, the same level of complexity that applies to the languages/implementation mechanisms of a data repository also exists in interpreting the actions of the administrator being recorded.

The present disclosure addresses the above-noted and other deficiencies by providing a third party security professional (hereinafter referred to as a "security administrator") who may not know the available commands and privileges defined by the language of specific data repositories, the ability to set a single high level security policy that can be applied to one or more data repositories. Embodiments of the present disclosure provide a means for a security administrator to specify security policy at a broad/high level (e.g., "only these 3 users can update personally identifiable information (PII)") along multiple dimensions as opposed to a low level (e.g., lower level specific commands such as modification of object or table level privileges). For example, the embodiments described herein do not simply provide a security administrator with a replica of the exact entitlement model of a data repository because the third party security administrator may have difficulty understanding an entitlement model that can include over 300 privileges. Instead, the security administrator may be provided a generic/high level model defined by a set of abstractions (e.g., read/write data, change schema, change security privileges) which it may use to define security policy. Similarly, on the data/resource dimension, a database privilege model (for a relational database) allows data repository administrators to administer privileges on tables, views, and procedures. Such a model keys on e.g., schemas and tables, so data repository administrators can provide users with privileges for updating, inserting, and/or deleting data on a particular table etc. However, a security administrator may have difficulty knowing/utilizing said model, and would be better served with a more generic/high level privilege model for defining security policy.

In some embodiments, a processing device is used to generate a set of abstractions that define a security policy language based on data in a data repository collection. The set of abstractions may define a security policy language, which may be provided to a security administrator (not a data repository administrator) who can define a security policy with the security policy language. The processing device may receive a security policy defined using the security policy language and translate the security policy into a common physical language to generate a common physical policy. The processing device may then translate the common physical policy into a set of commands for each of one or more data repositories that the data repository collection is comprised of. Each data repository may implement its respective set of commands using its own access control layer, and no separate access control system/layer is added to the architecture as a go between.

FIG. 1 is a block diagram that illustrates an example system 100. As illustrated in FIG. 1, the system 100 includes computing device 110, database server 120, a data repository collection 130 and a network 140. The computing device 110, database server 120, and the data repository collection 130 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g. cell towers), etc. The network 140 may carry communications (e.g., data, message, packets, frames, etc.) between computing device 110 and database server 120. The computing device 110 and database server 120 may each include hardware such as processing device 120B (e.g., processors, central processing units (CPUs)), memory 120A (e.g., random access memory (RAM), storage devices (e.g., hard-disk drive (HDD)), and solid-state drives (SSD), etc.), and other hardware devices (e.g., sound card, video card, etc.). A storage device may comprise a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. The data repository collection 130 may comprise one or more storage devices (e.g., hard-disk drive (HDD), and solid-state drives (SSD), etc.) for storing data.

FIG. 1 and the other figures may use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral.

The computing device 110 and database server 120 may comprise any suitable type of computing device or machine that has a programmable processor including, for example, server computers, desktop computers, laptop computers, tablet computers, smartphones, set-top boxes, etc. In some examples, the computing device 110 and database server 120 as well as data repository collection 130 may each comprise a single machine or may include multiple interconnected machines (e.g., multiple servers configured in a cluster). The computing device 110 and database server 120 as well as data repository collection 130 may be implemented by a common entity/organization or may be implemented by different entities/organizations. For example, computing device 110 may be operated by a first company/corporation and database server 120 and data repository collection 130 may be operated by a second company/corporation. The computing devices 110 and 120 may each execute or include an operating system (OS), as discussed in more detail below. The OSs of computing device 110 and database server 120 may manage the execution of other components (e.g., software, applications, etc.) and/or may manage access to the hardware (e.g., processors, memory, storage devices etc.) of the computing device.

As illustrated in FIG. 1, computing device 110 may run an application 116 which may allow a user to interact with data repository collection 130. When the user wants to access the data repository collection 130, they may utilize application 116 (which may be e.g., a client w/a graphical user interface (GUI)) to connect to the data repository collection 130 or database server 120, and make calls to a data repository (e.g., queries). The application 116 may interact with database server 120 which employs one or more network links (not shown) for accessing the data repository collection 130. The data repository collection 130 may comprise multiple data repositories 131 of different types such as an object storage system, a database, a file system, or a cloud storage layer, for example. The database server 120 may include access control system 210 which may include an individual access control layer, entitlement model, data model, etc. for each data repository 131, which may all differ from one another.

The access control system 210 may regulate access to the data stored in data repository collection 130 only to those people who are allowed to access such data and restricts access to unauthorized persons. The access control system 210 may perform user authorization to determine whether a user should be allowed to access the data or make the transaction they are attempting to make. There are numerous types of access control methods including Discretionary Access Control (DAC), Mandatory Access Control (MAC), and Role Based Access Control (RBAC), which is the most commonly used, for example. RBAC grants access based on a user's role and implements key security principles such as "least privilege" and "separation of privilege." Thus, a user attempting to access information can only access data necessary for their role.

As discussed herein, a security administrator can provide security for a data repository, such as multi-factor authentication, for example. However, it is difficult for a security administrator to set the security policy because that function is generally the purview of the database administrator owing to the language specific nature of the security policy. In addition, a security administrator may not have the requisite skill set to understand the different languages/implementation mechanisms of a variety of different data repositories. As a result, instead of managing access, many security administrators have adopted a trust but verify approach where a data repository administrator may operate while the third party system "records" everything they do. However, the same level of complexity that applies to the languages/implementation mechanisms of a data repository also exists in the activities of the database administrator being recorded.

Figure 2:
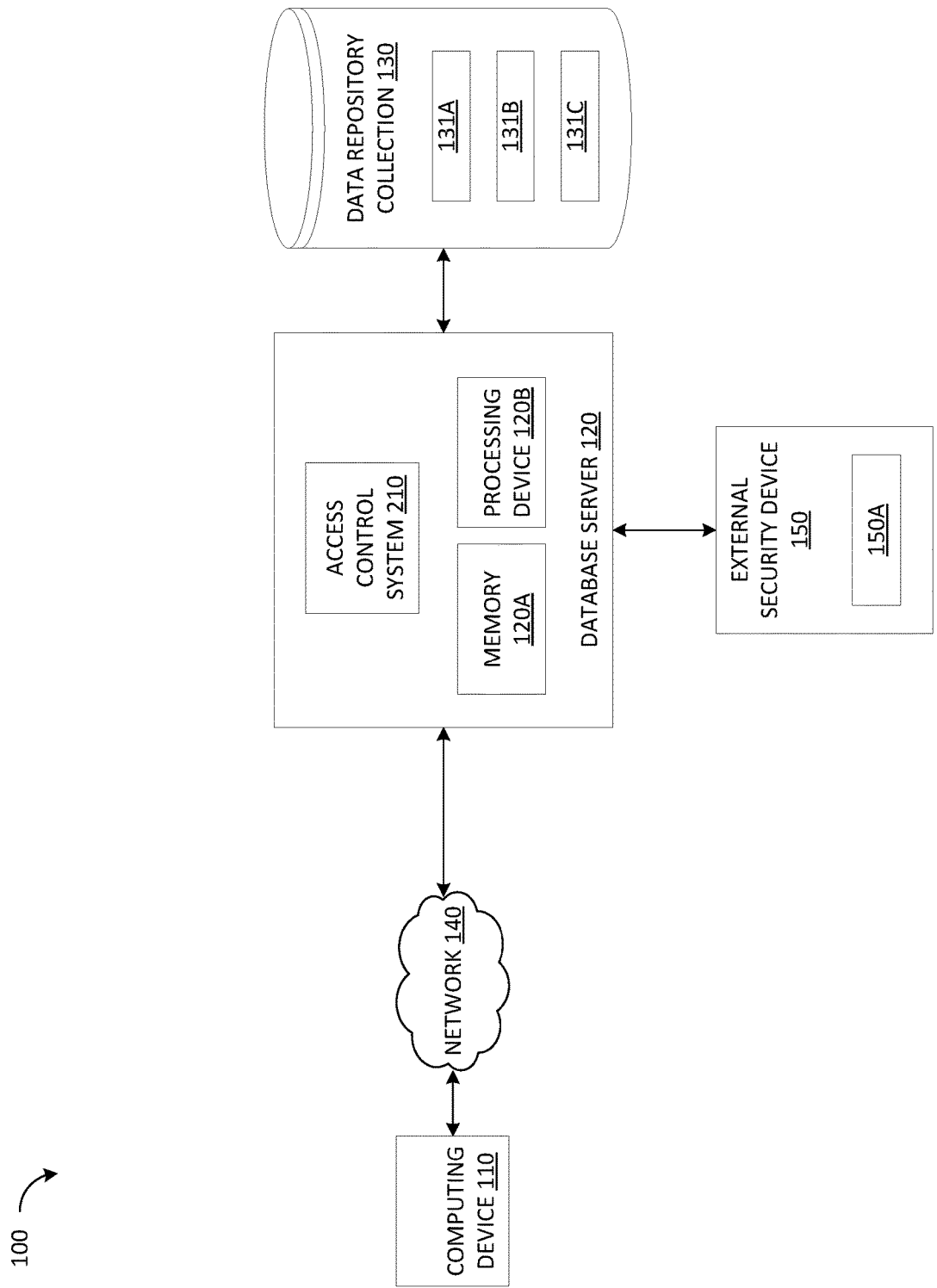
FIG. 2 is a block diagram that illustrates an example system, in accordance with some embodiments of the present disclosure.

FIG. 2 illustrates the system 100 in accordance with some embodiments of the present disclosure. As can be seen, FIG. 2 illustrates system 100 with external security device 150 coupled to the database server 120. The external security device 150 may be a computing device similar to computing device 110 and database server 120, and may include an external access control module 150A (hereinafter referred to as external access control 150A) which may be logic executed in order to perform the embodiments described herein.

As discussed in further detail herein, the external access control 150A may obtain a set of abstractions that define a security policy language at a high level (e.g., can be applied to data repository collection 130 as a whole), translate a security policy defined by the security administrator using the security policy language to a common physical policy based on a common physical language, translate the common physical policy into a set of commands for each of one or more of the data repositories 131, and implement the set of commands for each of one or more of the data repositories 131, as discussed in further detail herein. Although discussed in terms of an external security device 150 coupled to the database server 120, embodiments of the present disclosure (e.g., the functions of external access control 150A) may also be implemented using an agent located on the computing device 110 or database server 120 themselves.

Based on the data within data repository collection 130 (which may comprise data from different data repositories 131 in different languages), external access control 150A may obtain a set of abstractions that define a security policy language. Each abstraction in the set of abstractions may define a term of the security policy language, which may be used by the security administrator to define a security policy at a high level, as discussed in further detail herein.

In order to obtain the set of abstractions, the external access control 150A may analyze the data within the data repository collection 130 in order to determine labels and tags to apply to the data. The data within the data repository collection 130 may comprise any appropriate data such as PII data, privacy data, or employee data, for example. External access control 150A may use the tagged and labeled data to start coalescing the data into groups iteratively. The tags and labels may allow the external access control 150A to determine appropriate groupings based on attributes of the data, as opposed to table/schema names. Each grouping determined in this way may correspond to an abstraction in the set of abstractions, as discussed in further detail herein. The external access control 150A may perform this iterative process of tagging/labeling and grouping along a number of dimensions such as the data dimension, location dimension, privilege/entitlement dimension, and identity dimension, for example.

Figure 3:
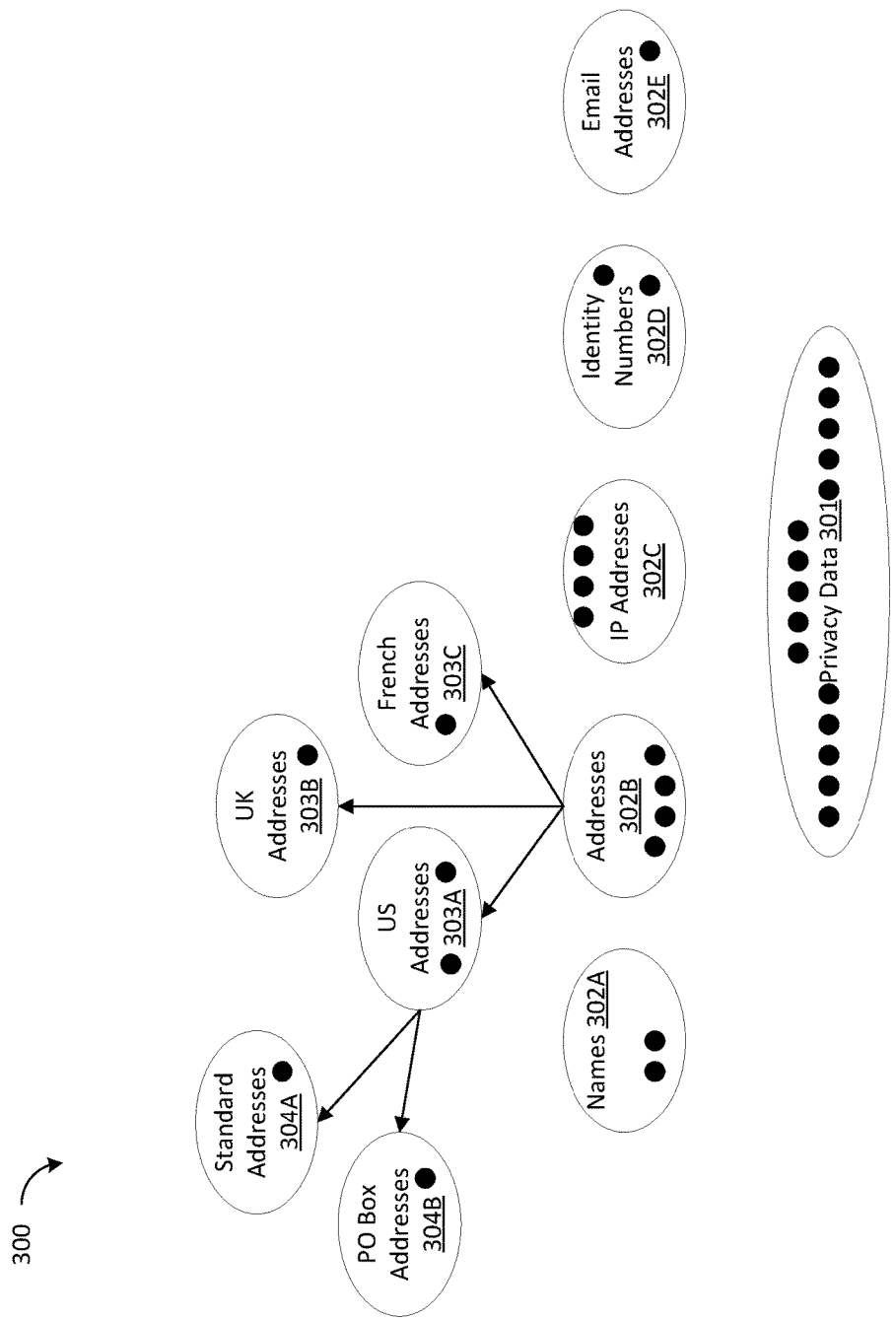
FIG. 3 is a diagram illustrating an example clustering/grouping of data in a data repository, in accordance with some embodiments of the present disclosure.

FIG. 3 illustrates an example of data groupings (along the data dimension) to generate a set of abstractions, where data 301 corresponds to the data within the data repository collection 130 and comprises privacy related data. It should be noted that each black circle illustrated in FIG. 3 may represent a data point of the data 301. Referring simultaneously to FIGS. 2 and 3, the external access control 150A may determine tags for the privacy data 301 including names, addresses, identity numbers, email addresses, and IP addresses. The external access control 150A may analyze the privacy data 301 as discussed in further detail herein to determine these tags and labels. The external access control 150A may group the privacy data 301 into the following groups based on these determined tags: names 302A, addresses 302B, identity numbers 302C, email addresses 302D, and IP addresses 302E. It should be noted that the physical data of privacy data 301 itself has no concepts of these tags or labels, i.e., the physical data may simply comprise a table called "xyz," having a column that is called "abc." The external access control 150A may enrich the physical data with the tags and labels in order to group the data. When the external access control 150A runs another iteration of the grouping, it may determine tags and/or labels for the data inside each group 302 and further group the data in each group 302 based on the determined tags and labels. As shown in FIG. 3, when the external access control 150A runs another iteration of the grouping, it may determine the following tags within the addresses 302 group: US addresses, UK addresses, and French addresses. The external access control 150A may then further group the data within the addresses 302 group into the following groups: US addresses 303A, UK addresses 303B, and French addresses 303C. In a further grouping iteration, the external access control 150A may tag and group the data within the US addresses 303A group into the following groups: standard addresses 304A and PO box addresses 304B.

The external access control 150A may analyze the data 301 within the data repository collection 130 to infer appropriate tags and labels from the data 301. When the external access control 150A infers tags and labels from the data 301, it may apply analytics on the data 301 that involves determining what tags and/or labels for the data 301 can be obtained from various sources and systems, such as the data repository collection 130 itself, a Lightweight Directory Access Protocol (LDAP) system (a lightweight client-server protocol for accessing directory services—not shown), or a system that analyzes vulnerabilities (not shown), for example. In one example, the external access control 150A may utilize data from a vulnerability analysis system to generate tags corresponding to risk levels for individual data objects e.g., tables or schemas. Thus, the individual data objects may be grouped by risk level (e.g., grouping along the data dimension), and each risk level may correspond to an abstraction, as discussed in further detail herein. In this way, the security administrator may generate a security policy including a rule that specifies a maximum risk level allowed for a user to connect directly to the data repository collection 130 (e.g., a user may not connect directly to the data repository collection 130 if the risk level of the data they are requesting is above 7). In another example, the external access control 150A may analyze data from different customers (e.g., on different data repositories 131) and observe different role creation privileges (e.g., how different customers create roles). The external access control 150A may determine that although the methods of creating roles are different from customer to customer, they are ultimately performing the same task and may thus infer a tag for role creation and group different role creation privileges together into one group (e.g., grouping along the privilege dimension). In this way, the external access control 150A may create a better abstraction for role creation.

Thus, regardless of the composition of data 301, external access control 150A may tag/label the data 301 along multiple dimensions and group the data 301 into groups based on the tags/labels along those multiple dimensions, and then iteratively repeat this process to generate successively smaller groups until it determines that no further grouping is necessary based on a grouping threshold. The multiple dimensions may correspond to each area where there are terms e.g., data dimension, privilege dimension, identity dimension, location dimension etc. The external access control 150A may assign a name (i.e., abstraction) to each grouping of data and the abstraction of each group may comprise the set of abstractions. Examples of abstractions may include "risk level 5," "role creation," "change schema," and "US addresses," among others. In the example of FIG. 3, the external access control 150A may assign an abstraction to each group of data 302, 303, and 304, and the abstraction of each group together may comprise the set of abstractions (e.g., the abstraction for each group 302A-E, 303A-C, and 304A-B). Additional examples of abstractions include "read/write data," "change schema," and "change security privileges," among others. The security policy language may be defined by the set of abstractions generated by the external access control 150A in this manner.

In some embodiments, the external access control 150A may determine tags/labels and groupings for the data 301 based additionally in part on a function of the security administrator. For example, if the security administrator is defining a security policy for a data repository 131 corresponding to a bank, they may require additional tags for e.g., standard customers, high net-worth customers, business customers etc. Thus, the external access control 150A may account for the functions of the security administrator in addition to the criteria discussed above when determining tags/labels and groupings.

The external access control 150A may treat the grouping discussed above as a multi-dimensional clustering problem that can be solved by the use of clustering algorithms with additional heuristics to perform the grouping described herein. Examples of heuristics include specific grouping rules to enable change requests (e.g., temporary re-adjustments in privileges) and changes to the groups to intentionally draw an attacker to a certain groups of resources (deception), among others.

As discussed herein, the external access control 150A may utilize a pre-defined grouping threshold to determine when to stop grouping the data. The grouping threshold may correspond to a number of groups, may correspond to a certain course, or may correspond to a point when the loss of resolution causes tags and labels to be meaningless. For example, if the groupings result in a level of granularity that is too high (e.g., too many groupings or no groupings at all), this may result in a set of abstractions with hundreds of rules which may be difficult for the security administrator to utilise. However, if the level of granularity is too low (e.g., insufficient groups or only one grouping) then each abstraction in the set of abstractions will be meaningless. Thus, the grouping threshold may correspond to level of granularity that balances these competing concerns. In some embodiments, the grouping threshold may be based in part on a function of the security administrator. Continuing with the examples discussed above where the security administrator is defining a security policy for a data repository 131 corresponding to a bank, the external access control 150A may utilize information from the bank indicating that standard customers, high net-worth customers, and business customers are the only ways in which their customers are segmented, the grouping threshold may indicate that this level of granularity is the point at which bank customers may not be grouped any further (e.g., high net-worth customers do not need to be further grouped into high net-worth, and ultra-high net-worth customers).

As discussed above, the set of abstractions may define a security policy language, which may be provided to the security administrator (not a database administrator) who can define a security policy with the security policy language and provide the security policy to the external access control 150A. The security policy may have sentences, comprising verbs and objects (which may or may not be database or language specific) based on the abstractions from the set of abstractions. Each sentence may represent a "rule" of the security policy. The external access control 150A may take these sentences and translate them as discussed in further detail herein.

In some embodiments, the external access control 150A may further allow the security administrator to consider the runtime behavior of the session when generating rules/sentences of the security policy. More specifically, the external access control 150A may provide runtime values (session attributes) along with the set of abstractions to allow the security administrator to specify rules that comprise a combination of runtime values (session attributes) with data attributes. For example, the security administrator may specify a rule that blocks all users having an IP range of 10.0.0.0-10.0.5.0 for data repositories in the United States. Another such example rule may specify that "a user logging in from Europe can only view data about European residents while the exact same user logging in from the United States will not be able to view the data about European residents but only United States residents." Additional example rules combining runtime values (session attributes) with data attributes may specify that "all users that fetch more than 1 million events for PII data are to be blocked," and that "sessions longer than 10 minutes involving privileged actions on certain data repositories are to be blocked." In some embodiments, the external access control 150A may further allow the security administrator to allow the customer to set a periodic/time based/scheduled set of rules to account for e.g., security policy rules that may change over time or even in a periodic way.

Figure 4:
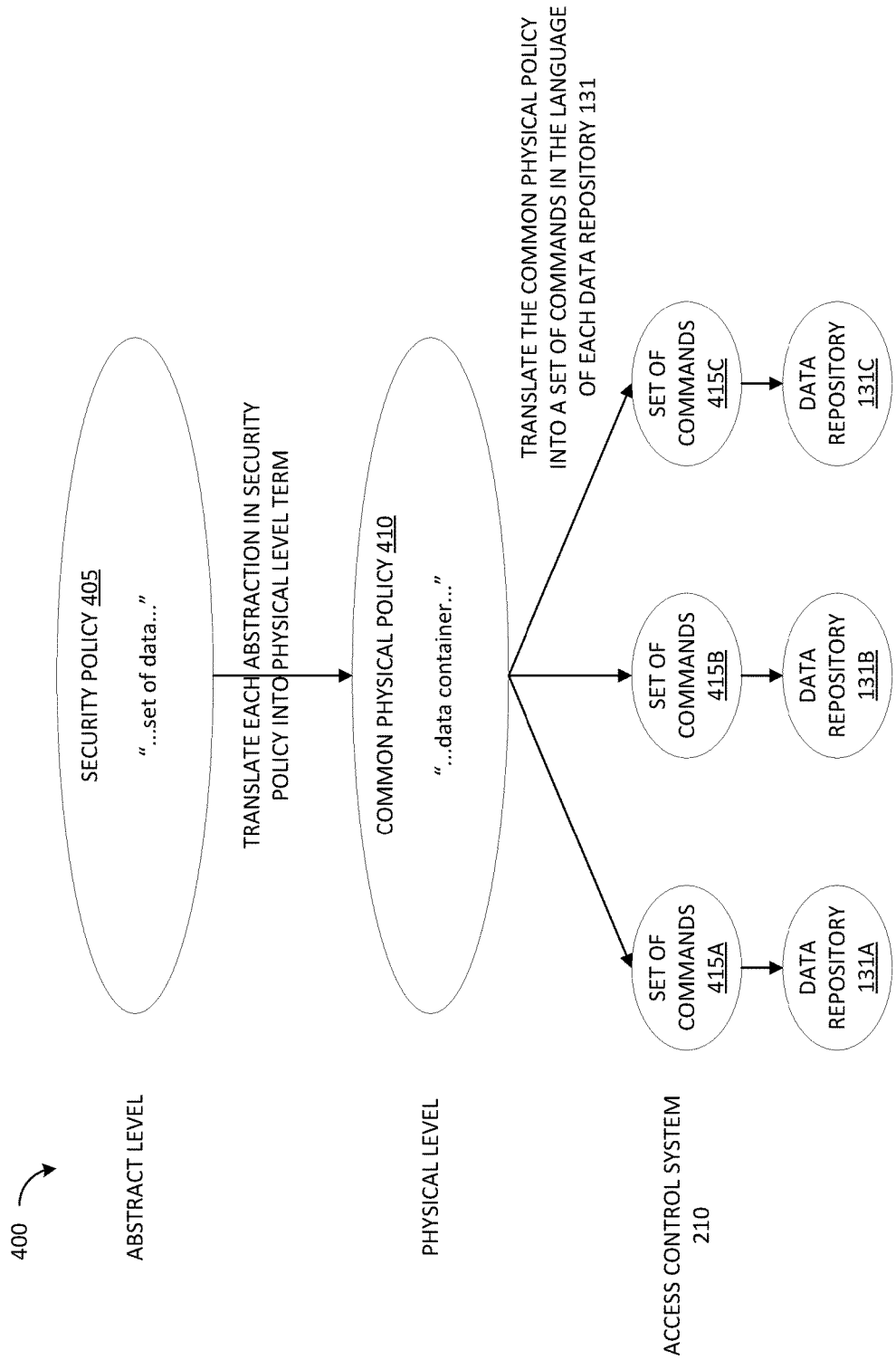
FIG. 4 is a diagram illustrating an example translation of a security policy into one or more sets of commands that are each specific to a data repository, in accordance with some embodiments of the present disclosure.

Referring also to FIG. 4, the process of translating the security policy (illustrated as security policy 405 in FIG. 4) defined by the security administrator may involve a translation of the security policy defined at the abstract level (e.g., using the set of abstractions) to a security policy defined at the physical level (e.g., using a common physical language) as well as a translation from the security policy defined at the physical level to the access control system 210 that controls access to the data repository collection 130. With respect to the translation from the abstract level to the physical level, because the data 301 (data within the data repository collection 130) may be sourced from multiple data repositories 131, the external access control 150A must normalize it. Stated differently, external access control 150A may translate the security policy 405 into a common physical language to generate a common physical policy 410 that can be used to translate back and forth between the physical data repositories 131. For example, an abstraction in the security policy 405 referring to a "set of data" may be referred to as a collection in an SQL database, as a bucket in an object storage, and as a table in another type of data repository 131. However, the external access control 150A may create a name to represent a "set of data" at the physical level, which can be used to map it back and forth between any of the data repositories 131. In this example, the external access control 150A may define such a set of data as a data container, which can be a table, a collection, a bucket or any other corresponding unit of data. In this way, the external access control 150A may create a name to represent each abstraction of the security policy 405 at the physical level thereby creating a common physical policy 410 from the security policy 405 by translating each of the abstractions in the security policy 405 into a corresponding common physical term.

The translation from the physical level to the access control system 210 that controls access to the data repository collection 130 involves a 1 to many translation (i.e., translation from the common physical level to the language of each relevant individual data repository 131). The external access control 150A may take the business level sentences that the common physical policy is comprised of and for each data repository 131, translate the business level sentences into a set of specific command(s) that go into the data repository 131. For example, if the external access control 150A needs to translate a common physical policy rule that states that "only certain users may access PII," the external access control 150A may determine the data repositories 131 where PII exists, (e.g., based on the buckets, tables, and/or HDFS locations, where the PII exists) and translate the rule into the language of these different data repositories 131. In this way, the external access control 150A may translate the common physical policy 410 into a set of commands 415 for each of the relevant data repositories 131.

The external access control 150A may be connected to each data repository 131. Once the translation of the security policy is complete, the rules specified in the security policy are now converted into a set of commands in the language of each data repository 131. For each data repository 131, the external access control 150A may connect to that data repository 131 and provide the set of commands to the corresponding access control layer within access control system 210 of that particular data repository 131. The access control system 210 may implement the commands for each data repository 131. It should be noted that the external access control 150A does not create a separate access control layer, but uses the existing access control layers of access control system 210 to implement the set of commands on each data repository 131. In this way, the customer does not have to perform these translation functions.

In some embodiments, differences in the capabilities of the access control layers for each data repository 131 may require the external access control 150A to compensate for such differences. For example, the access control layer for a particular data repository 131 may not support column level commands etc. As a result, if the access control layer of data repository 131A can execute its respective commands, but the access control layers of data repositories 131B and 131C are unable to do so, then data repositories 131B and 131C may not be able to implement the security policy. To compensate for this, when the external access control 150A determines that an access control layer for a particular data repository 131 cannot support its corresponding set of commands, it may create a database view or a stored procedure that accesses the base table of and applies further filtering within that particular data repository 131. The database view or stored procedure may perform the access control functions that the access control layer of that particular data repository 131 cannot perform without using the database view or stored procedure. The database view or stored procedure may then remove privileges from the relevant table, and ensure that all users use the view or stored procedure, and cannot directly use the base table.

There are scenarios in which a security administrator may wish to have a high level description/summary of a particular data repository 131. For example, in order to set a security policy, an understanding of the entitlements in the data repository 131 may be required. Thus, a security administrator may want to know for a particular data repository 131, what users have access to what data? The data repository 131 may answer by providing a comprehensive list of entitlements that various users have on the data. However, providing entitlement information in this manner is too broad, and will not enable the security administrator to provide adequate security. This is because the security administrator is unable to understand these lists as they are too granular, and the entitlement models are too complex (e.g., a network style model having recursive having loops and other complex structures). In some embodiments, the external access control 150A may perform the reverse of the translation steps described above with respect to FIG. 4 on data in a data repository 131 in order to synthesize a high level description/summary of the data repository 131.

Stated differently, the external access control 150A may consume the large amount of myriad data in the data repository 131 (e.g., definitions about entitlements, etc.) and normalize it before analyzing the data to generate one or more sentences that comprise a high level description of the data in the data repository 131. For example, the external access control 150A may reverse translate and normalize a large number of commands into high level statements such as create index, drop index, alter index, create procedure, drop procedure, alter procedure, create view, drop view, alter view etc. The external access control 150A may then analyze these high level statements to determine a summary. In this example, the external access control 150A may analyze the above high level statements and infer that the commands indicate a user who can create object dependencies. The above example is described with respect to the privilege dimension where a list of granular privileges was taken and summarized as a "schema change" privilege (or Data Definition Language commands). Similar examples exist in the other dimensions the security policy manages such as the user dimension, the data/resource dimension or even the network topology dimension. In one example referring to the data dimension, a set of statements that provide read permissions to 1000 different tables may be reverse translated and normalized to determine that all of the 1000 tables contain PII. Based on this, a single summary statement that describes the ability to read PII may be created. In one example referring to the networking dimension, rules that pertain to IP addresses from which access to the data repository 131 is allowed versus IP addresses from which access is denied may be reverse translated and normalized to determine, for example, a single rule stating that "access to PII data is allowed from corporate offices but not from homes and not from outsourced locations."

Figure 5:
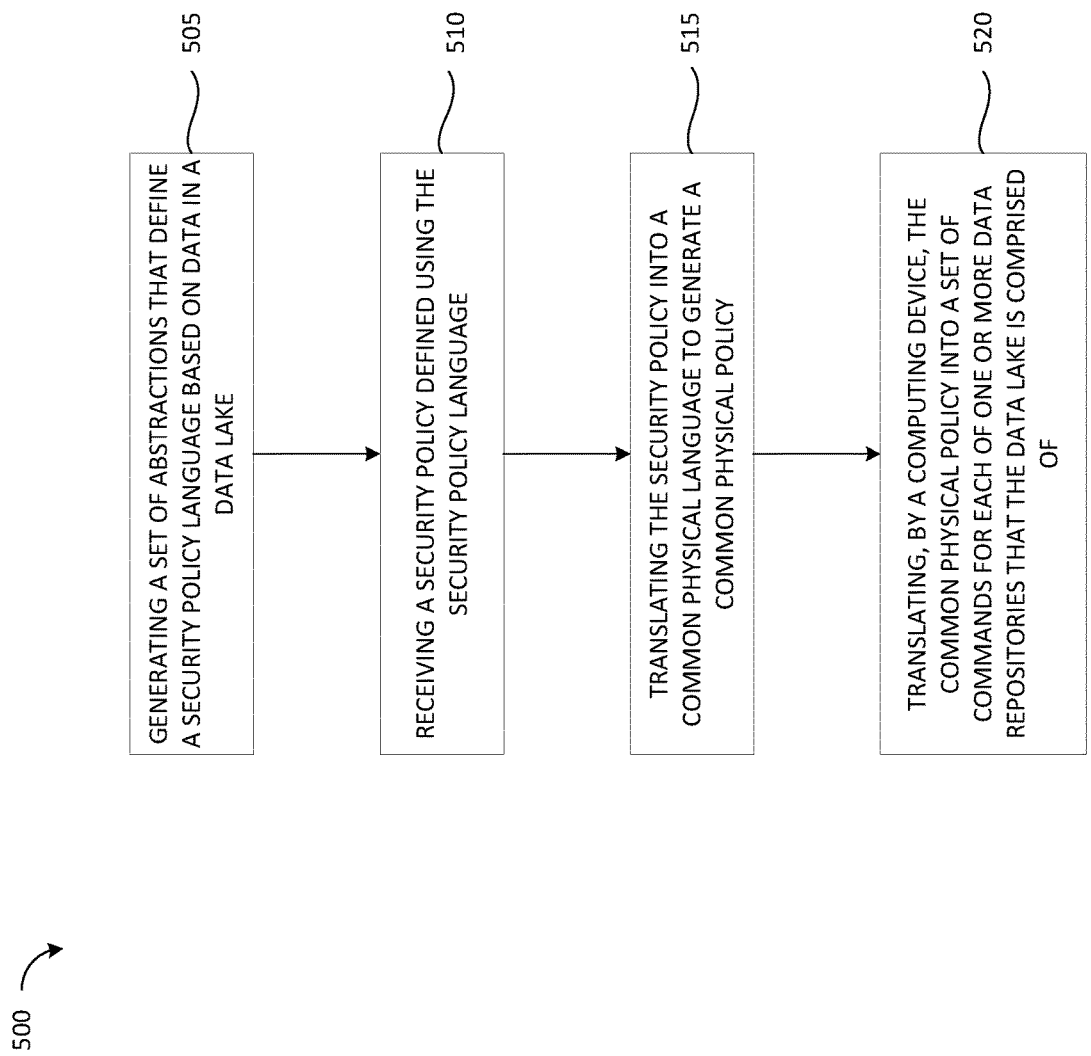
FIG. 5 is a flow diagram of a method of generating a security policy, in accordance with some embodiments of the present disclosure.

FIG. 5 is a flow diagram of a method 500 for generating a high level security policy, in accordance with some embodiments of the present disclosure. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by a computing device (e.g., computing device 150 illustrated in FIG. 2).

At block 505, based on the data within data repository collection 130 (which may comprise data from different data repositories 131 in different languages), external access control 150A may obtain a set of abstractions that define a security policy language. Each abstraction in the set of abstractions may define a term of the security policy language, which may be used by the security administrator to define a security policy at a high level, as discussed in further detail herein.

In order to obtain the set of abstractions, the external access control 150A may analyze the data within the data repository collection 130 in order to determine labels and tags to apply to the data. The data within the data repository collection 130 may comprise any appropriate data such as PII data, privacy data, or employee data, for example. External access control 150A may use the tagged and labeled data to start coalescing the data into groups iteratively. The tags and labels may allow the external access control 150A to determine appropriate groupings based on attributes of the data, as opposed to table/schema names. The external access control 150A may perform this iterative process of tagging/labeling and grouping along a number of dimensions such as the data dimension, location dimension, privilege/entitlement dimension, and identity dimension, for example. At block 510, computing device 150 may receive a security policy defined by the security admin using the security policy language.

Referring also to FIG. 4, the process of translating the security policy (illustrated as security policy 405 in FIG. 4) defined by the security administrator may involve a translation from the abstract level to the physical level as well as a translation from the physical level to the access control system 210 of the data repository collection 130. At block 515, with respect to the translation from the abstract level to the physical level, because the data 301 (data within the data repository collection 130) may be sourced from multiple data repositories 131, the external access control 150A must normalize it. Stated differently, external access control 150A may translate the security policy 405 into a common physical language to generate a common physical policy 410 that can be used to translate back and forth between the physical data repositories 131. For example, an abstraction in the security policy 405 referring to a "set of data" may be referred to as a collection in SQL, as a bucket in an object storage system, and as a table in another database. However, the external access control 150A may create a name to represent a "set of data" at the physical level, which can be used to map it back and forth between any of the data repositories 131. In this example, the external access control 150A may define such a set of data as a data container, which can be a table, a collection, a bucket or any other corresponding unit of data. In this way, the external access control 150A may create a name to represent each abstraction of the security policy 405 at the physical level thereby creating a common physical policy 410 from the security policy 405 by translating each of the abstractions in the security policy 405 into a corresponding common physical term.

At block 520, the external access control 150A may translate the common physical policy into a set of commands for each of the relevant data repositories 131. The translation from the physical level to the access control system 210 of the data repository collection 130 involves a 1 to many translation (i.e., translation from the common physical level to the language of each relevant individual data repository 131). The external access control 150A may take the business level sentences that the common physical policy is comprised of and for each data repository 131, translate each sentence into a specific command(s) that go into the relevant data repositories. For example, if the external access control 150A needs to translate a common physical policy rule that states that "only certain users may access PII," the external access control 150A may determine the data repositories 131 where PII exists, (e.g., the S3 buckets, Red Shift tables, HDFS locations, where PII exists) and translate the rule into the language of these 4 different data repositories 131. In this way, the external access control 150A may translate the common physical policy 410 into a set of commands 415 for each of the relevant data repositories 131.

The external access control 150A may be connected to each data repository 131. Once the translation of the security policy is complete, the rules specified in the security policy are now converted into a set of commands in the language of each data repository 131. For each data repository 131, the external access control 150A may connect to that data repository 131 and provide the set of commands to the corresponding access control layer of that particular data repository 131. The access control system 210 may implement the commands for each data repository 131. It should be noted that the external access control 150A does not create a separate access control layer, but uses the existing access control layers of access control system 210 to implement the set of commands on each data repository 131. In this way, the customer does not have to perform these translation functions.

Figure 6:
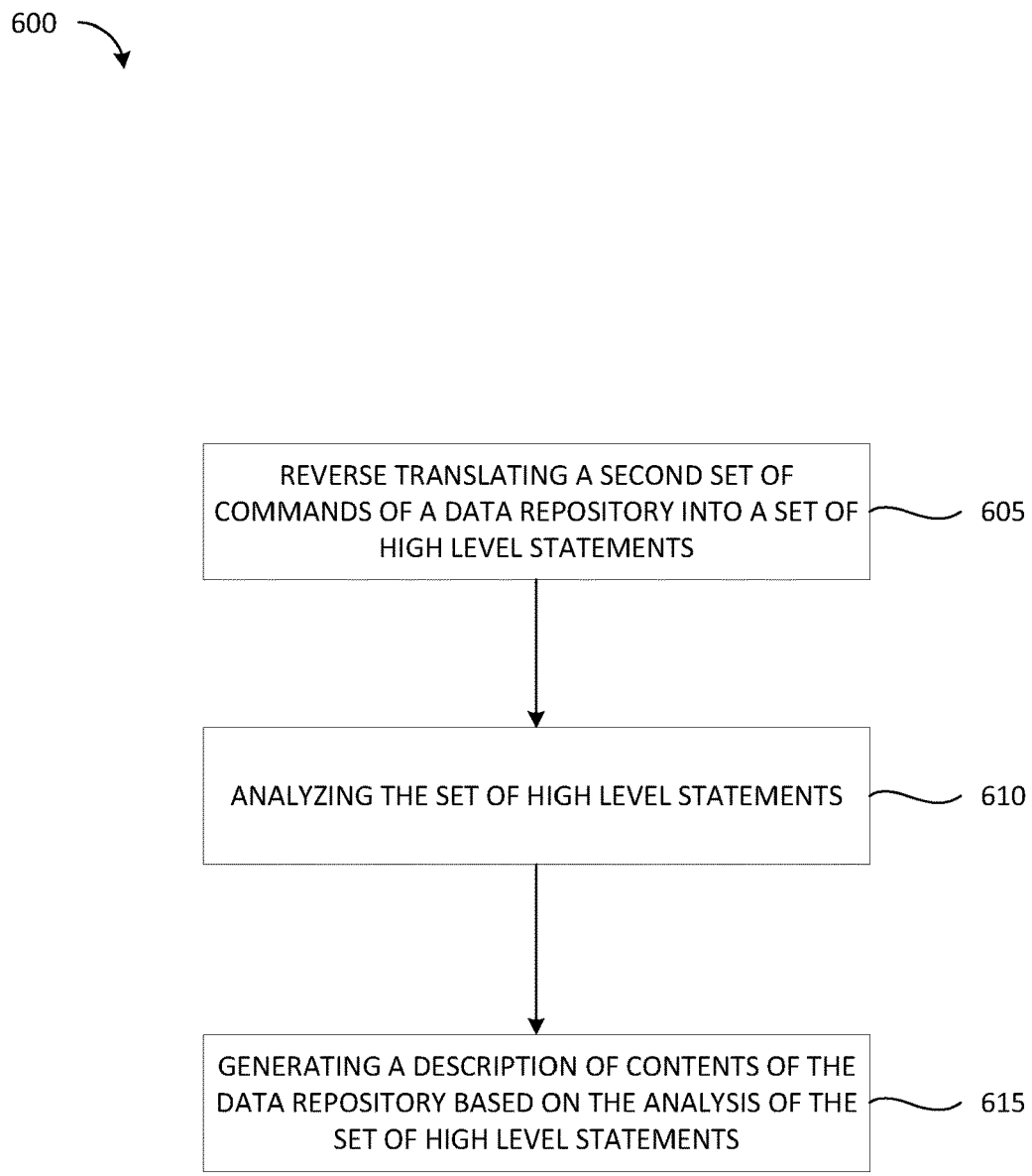
FIG. 6 is a flow diagram of a method for generating a high level summary of the contents of a data repository, in accordance with some embodiments of the present disclosure.

FIG. 6 is a flow diagram of a method 600 for reverse translating contents of a data repository to obtain a high level summary of the contents of the data repository, in accordance with some embodiments of the present disclosure. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 600 may be performed by a computing device (e.g., computing device 150 illustrated in FIG. 2).

There are scenarios in which a security administrator may wish to have a high level description/summary of a particular data repository 131. For example, in order to set a security policy, an understanding of the entitlements in the data repository 131 may be required. Thus, a security administrator may want to know for a particular data repository 131, what users have access to what data?

The external access control 150A may consume the large amount of myriad data in the data repository 131 (e.g., definitions about entitlements, etc.) and normalize it before analyzing the data to generate one or more sentences that comprise a high level description of the data in the data repository 131. More specifically, at block 605, the external access control 150A may reverse translate and normalize a large number of commands into high level statements such as create index, drop index, alter index, create procedure, drop procedure, alter procedure, create view, drop view, alter view etc. At block 610, the external access control 150A may then analyze these high level statements to a determine a summary/description of contents of the data repository 131 based on the analysis of the set of high level statements at block 615. In this example, the external access control 150A may analyze the above high level statements and infer that the commands indicate a user who can create object dependencies.

Figure 7:
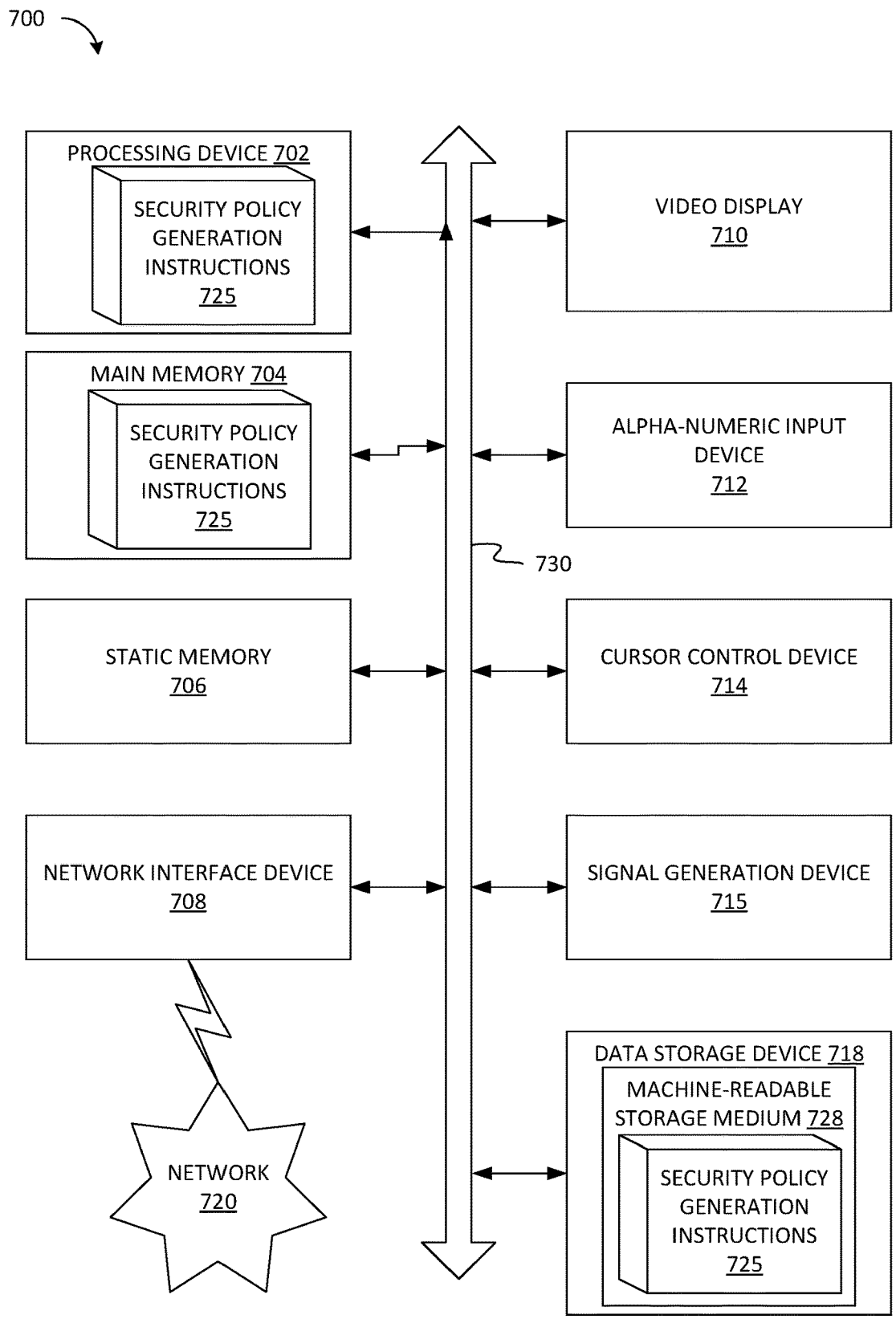
FIG. 7 is a block diagram of an example computing device that may perform one or more of the operations described herein, in accordance with some embodiments of the present disclosure.

FIG. 7 illustrates a diagrammatic representation of a machine in the example form of a computer system 700 within which a set of instructions, for causing the machine to perform any one or more of the methodologies discussed herein for generating a high level security policy.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may be representative of a server.

The example computer system 700 includes a processing device 702, a main memory 704 (e.g., read-only memory (ROM), flash memory, dynamic random access memory (DRAM), a static memory 706 (e.g., flash memory, static random access memory (SRAM), etc.), and a data storage device 718, which communicate with each other via a bus 730. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 700 may further include a network interface device 708 which may communicate with a network 720. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and an acoustic signal generation device 716 (e.g., a speaker). In one embodiment, video display unit 710, alphanumeric input device 712, and cursor control device 714 may be combined into a single component or device (e.g., an LCD touch screen).

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute security policy generation instructions 725, for performing the operations and steps discussed herein.

The data storage device 715 may include a machine-readable storage medium 728, on which is stored one or more sets of security policy generation instructions 725 (e.g., software) embodying any one or more of the methodologies of functions described herein. The security policy generation instructions 725 may also reside, completely or at least partially, within the main memory 704 or within the processing device 702 during execution thereof by the computer system 700; the main memory 704 and the processing device 702 also constituting machine-readable storage media. The security policy generation instructions 725 may further be transmitted or received over a network 620 via the network interface device 708.

The machine-readable storage medium 728 may also be used to store instructions to perform a method for generating a high level security policy, as described herein. While the machine-readable storage medium 728 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A method comprising:
    generating a set of abstractions that define a security policy language based on data in a set of data repositories;
    receiving a security policy defined using the security policy language;
    translating the security policy into a common physical language to generate a common physical policy; and
    translating, by a computing device, the common physical policy into a set of commands for each of one or more data repositories that the set of data repositories is comprised of, the set of commands to restrict access to the one or more data repositories by one or more users associated with respective computing devices, and wherein the translation into the set of commands is a one to many translation from the common physical language to the language of each of the one or more data repositories.

2. The method of claim 1, further comprising:
    reverse translating a second set of commands of the set of data repositories into a set of high level statements;
    analyzing the set of high level statements; and
    generating a description of contents of the data repository based on the analysis of the set of high level statements.

3. The method of claim 1, wherein generating the set of abstractions comprises:
    iteratively, until a grouping threshold has been reached:
        assigning a set of tags and labels among the data in the set of data repositories;
        grouping the data in the set of data repositories into one or more groups based on the set of tags and labels; and
        determining if the grouping threshold has been reached; and
    in response to determining that the grouping threshold has been reached, assigning an abstraction to each group to generate the set of abstractions.

4. The method of claim 1, wherein the security policy comprises one or more sentences, each sentence comprising one or more abstractions of the security policy language, and wherein translating the security policy into the common physical language comprises:
    converting each abstraction of the security policy into a common physical abstraction.

5. The method of claim 1, wherein translating the common physical policy into a set of commands for a data repository comprises translating the common physical policy into a set of commands based on a language of the data repository.

6. The method of claim 5, wherein each of the one or more data repositories implements a respective set of commands using a corresponding access control layer.

7. The method of claim 6, further comprising:
    determining that an access control layer of a particular data repository cannot execute its respective set of commands;
    generating a view in the particular data repository; and
    executing the respective set of commands of the particular data repository using the view.

8. A system comprising:
    a memory; and
    a processing device operatively coupled to the memory, the processing device to:
        generate a set of abstractions that define a security policy language based on data in a set of data repositories;
        receive a security policy defined using the security policy language;
        translate the security policy into a common physical language to generate a common physical policy; and
        translate the common physical policy into a set of commands for each of one or more data repositories that the set of data repositories is comprised of, the set of commands to restrict access to the one or more data repositories by one or more users associated with respective computing devices, and wherein the translation into the set of commands is a one to many translation from the common physical language to the language of each of the one or more data repositories.

9. The system of claim 8, wherein the processing device is further to:
    reverse translate a second set of commands of a data repository of the set of data repositories into a set of high level statements;
    analyze the set of high level statements; and
    generate a description of contents of the data repository based on the analysis of the set of high level statements.

10. The system of claim 8, wherein to generate the set of abstractions, the processing device is to:
    iteratively, until a grouping threshold has been reached:
        assign a set of tags and labels among the data in the set of data repositories;

group the data in the set of data repositories into one or more groups based on the set of tags and labels; and
determine if the grouping threshold has been reached; and in response to determining that the grouping threshold has been reached, assign an abstraction to each group to generate the set of abstractions.

11. The system of claim 8, wherein the security policy comprises one or more sentences, each sentence comprising one or more abstractions of the security policy language, and wherein to translate the security policy into the common physical language, the processing device is further to:
convert each abstraction of the security policy into a common physical abstraction.

12. The system of claim 8, wherein to translate the common physical policy into a set of commands for a data repository, the processing device is to translate the common physical policy into a set of commands based on a language of the data repository.

13. The system of claim 12, wherein each of the one or more data repositories implements a respective set of commands using a corresponding access control layer.

14. The system of claim 13, wherein the processing device is further to:
determine that an access control layer of a particular data repository cannot execute its respective set of commands;
generate a view in the particular data repository; and
execute the respective set of commands of the particular data repository using the view.

15. A non-transitory computer-readable medium having instructions stored thereon which, when executed by the processing device, cause the processing device to:
generate a set of abstractions that define a security policy language based on data in a set of data repositories;
receive a security policy defined using the security policy language;
translate the security policy into a common physical language to generate a common physical policy; and
translate, by the processing device, the common physical policy into a set of commands for each of one or more data repositories that the set of data repositories is comprised of, the set of commands to restrict access to the one or more data repositories by one or more users associated with respective computing devices, and wherein the translation into the set of commands is a one to many translation from the common physical language to the language of each of the one or more data repositories.

16. The non-transitory computer-readable medium of claim 15, wherein the processing device is further to:
reverse translate a second set of commands of a data repository of the set of data repositories into a set of high level statements;
analyze the set of high level statements; and
generate a description of contents of the data repository based on the analysis of the set of high level statements.

17. The non-transitory computer-readable medium of claim 15, wherein to generate the set of abstractions, the processing device is to:
iteratively, until a grouping threshold has been reached:
assign a set of tags and labels among the data in the set of data repositories;
group the data in the set of data repositories into one or more groups based on the set of tags and labels; and
determine if the grouping threshold has been reached; and in response to determining that the grouping threshold has been reached, assign an abstraction to each group to generate the set of abstractions.

18. The non-transitory computer-readable medium of claim 15, wherein the security policy comprises one or more sentences, each sentence comprising one or more abstractions of the security policy language, and wherein to translate the security policy into the common physical language, the processing device is further to:
convert each abstraction of the security policy into a common physical abstraction.

19. The non-transitory computer-readable medium of claim 15, wherein to translate the common physical policy into a set of commands for a data repository, the processing device is to translate the common physical policy into a set of commands based on a language of the data repository.

20. The non-transitory computer-readable medium of claim 19, wherein each of the one or more data repositories implements a respective set of commands using a corresponding access control layer.

* * * * *